United States Patent
Decrop et al.

(10) Patent No.: US 12,033,619 B2
(45) Date of Patent: Jul. 9, 2024

(54) INTELLIGENT MEDIA TRANSCRIPTION

(71) Applicant: INTERNATIONAL BUSINESS MACHINES CORPORATION, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 17/095,797

(22) Filed: Nov. 12, 2020

(65) Prior Publication Data

US 2022/0148583 A1   May 12, 2022

(51) Int. Cl.
| | | |
|---|---|---|
| G10L 15/183 | (2013.01) |
| G06N 20/00 | (2019.01) |
| G09B 5/02 | (2006.01) |
| G09B 19/00 | (2006.01) |
| G10L 15/01 | (2013.01) |
| G10L 15/02 | (2006.01) |
| G10L 15/06 | (2013.01) |
| G10L 15/22 | (2006.01) |

(52) U.S. Cl.
CPC ............ *G10L 15/183* (2013.01); *G06N 20/00* (2019.01); *G10L 15/01* (2013.01); *G10L 15/02* (2013.01); *G10L 15/063* (2013.01); *G10L 15/22* (2013.01); *G09B 5/02* (2013.01); *G09B 19/003* (2013.01); *G10L 2015/225* (2013.01)

(58) Field of Classification Search
CPC ....... G10L 15/183; G10L 15/01; G10L 15/02; G10L 15/063; G10L 15/22; G10L 2015/225; G10L 15/26; G06N 20/00; G06N 3/044; G06N 3/045; G06N 3/08; G09B 5/02; G09B 19/003
USPC ........................................................ 704/235
See application file for complete search history.

(56) References Cited

U.S. PATENT DOCUMENTS

| | | | |
|---|---|---|---|
| 5,625,748 A * | 4/1997 | McDonough | G10L 15/1822 704/238 |
| 7,117,231 B2 | 10/2006 | Fischer | |
| 7,318,031 B2 * | 1/2008 | Bantz | H04M 3/523 704/235 |

(Continued)

FOREIGN PATENT DOCUMENTS

| | | | |
|---|---|---|---|
| WO | WO-2021026617 A1 * | 2/2021 | ............. G10L 15/02 |
| WO | WO-2021206679 A1 * | 10/2021 | |

OTHER PUBLICATIONS

X. Che, H. Yang and C. Meinel, "Automatic Online Lecture Highlighting Based on Multimedia Analysis," in IEEE Transactions on Learning Technologies, vol. 11, No. 1, pp. 27-40, Jan. 1-Mar. 2018, doi: 10.1109/TLT.2017.2716372. (Year: 2018).*

(Continued)

*Primary Examiner* — Thuykhanh Le
(74) *Attorney, Agent, or Firm* — Anthony M. Pallone

(57) ABSTRACT

The exemplary embodiments disclose a method, a computer program product, and a computer system for transcribing media. The exemplary embodiments may include collecting media, extracting one or more features from the media, and transcribing the media based on the extracted one or more features and one or more models.

13 Claims, 7 Drawing Sheets

(56) References Cited

U.S. PATENT DOCUMENTS

| | | | |
|---|---|---|---|
| 7,889,847 B2 | 2/2011 | Gainsboro | |
| 9,552,548 B1* | 1/2017 | Brestoff | G06N 3/04 |
| 9,641,681 B2 | 5/2017 | Nuta et al. | |
| 9,805,018 B1* | 10/2017 | Richfield | G06F 16/9535 |
| 10,978,077 B1* | 4/2021 | Cheng | G06V 30/1448 |
| 11,003,839 B1* | 5/2021 | Hatch | G06F 40/166 |
| 11,170,782 B2* | 11/2021 | Stoker | G09B 21/009 |
| 11,315,546 B2* | 4/2022 | Pappu | G11B 27/031 |
| 11,315,569 B1* | 4/2022 | Talieh | H04L 12/1831 |
| 11,431,517 B1* | 8/2022 | Lau | G10L 15/26 |
| 2007/0106508 A1* | 5/2007 | Kahn | G10L 15/22 704/E15.04 |
| 2009/0055175 A1* | 2/2009 | Terrell, II | G10L 15/26 704/235 |
| 2009/0300003 A1* | 12/2009 | Suzuki | G10L 15/1822 707/999.005 |
| 2011/0026689 A1* | 2/2011 | Metz | G10L 15/26 704/235 |
| 2011/0087491 A1* | 4/2011 | Wittenstein | G10L 15/26 704/235 |
| 2011/0099011 A1* | 4/2011 | Jaiswal | G10L 15/26 704/235 |
| 2011/0112832 A1* | 5/2011 | Prorock | G11B 27/36 704/E15.044 |
| 2012/0022865 A1* | 1/2012 | Milstein | H04M 3/42221 704/235 |
| 2013/0006623 A1* | 1/2013 | Chelba | G10L 15/187 704/E15.045 |
| 2014/0214426 A1* | 7/2014 | Kanevsky | G10L 15/08 704/251 |
| 2014/0350918 A1* | 11/2014 | Liu | G06F 40/166 704/9 |
| 2015/0279357 A1* | 10/2015 | Paxinos | G10L 15/1807 704/235 |
| 2017/0148341 A1* | 5/2017 | Boulton | G06F 40/126 |
| 2017/0236517 A1* | 8/2017 | Yu | G06F 3/048 704/235 |
| 2017/0287482 A1* | 10/2017 | Jackson | G10L 15/26 |
| 2018/0046710 A1* | 2/2018 | Raanani | G06F 40/30 |
| 2018/0143956 A1* | 5/2018 | Skarbovsky | G06F 40/166 |
| 2018/0144747 A1* | 5/2018 | Skarbovsky | G06F 40/109 |
| 2018/0174587 A1* | 6/2018 | Bermundo | G06F 3/1271 |
| 2018/0315429 A1* | 11/2018 | Taple | G10L 17/24 |
| 2018/0358052 A1* | 12/2018 | Miller | G11B 27/10 |
| 2019/0051301 A1* | 2/2019 | Locascio | G06V 40/172 |
| 2019/0175011 A1* | 6/2019 | Jensen | A61B 3/0033 |
| 2019/0236139 A1* | 8/2019 | DeFelice | G06N 3/044 |
| 2019/0236148 A1* | 8/2019 | DeFelice | G06N 3/047 |
| 2020/0190585 A1* | 6/2020 | Wassmann | A61P 35/00 |
| 2020/0243094 A1* | 7/2020 | Thomson | H04M 3/42382 |
| 2020/0265485 A1* | 8/2020 | Pachauri | G06Q 10/06393 |
| 2020/0286485 A1* | 9/2020 | Steelberg | G10L 15/063 |
| 2020/0321007 A1* | 10/2020 | Stoker | G10L 15/26 |
| 2020/0349950 A1* | 11/2020 | Yoshioka | G10L 15/32 |
| 2020/0395111 A1* | 12/2020 | Forzoni | G10L 15/1815 |
| 2021/0034819 A1* | 2/2021 | Wang | G06F 16/355 |
| 2021/0050000 A1* | 2/2021 | Danilo | G06V 40/174 |
| 2021/0076105 A1* | 3/2021 | Parmar | H04N 21/234336 |
| 2021/0174787 A1* | 6/2021 | Nguyen | G06F 3/0486 |
| 2021/0210097 A1* | 7/2021 | Diamant | H04N 7/15 |
| 2021/0264921 A1* | 8/2021 | Reece | G06F 40/169 |
| 2021/0375289 A1* | 12/2021 | Zhu | G06F 40/253 |
| 2021/0375291 A1* | 12/2021 | Zeng | H04L 67/306 |
| 2021/0383127 A1* | 12/2021 | Kikin-Gil | G06V 10/811 |
| 2021/0407506 A1* | 12/2021 | Drummond | G06F 16/3329 |
| 2022/0109585 A1* | 4/2022 | Asthana | G06F 40/289 |
| 2022/0115020 A1* | 4/2022 | Bradley | G06F 40/134 |
| 2023/0266874 A1* | 8/2023 | Inbar | G06F 3/04842 715/764 |

OTHER PUBLICATIONS

Anonymous, "Convolutional Neural Network," Wikipedia, https://en.wikipedia.org/wiki/Convolutional_neural_network, May 8, 2020, pp. 1-30.

Anonymous, "Long Short-Term Memory," Wikipedia, https://en.wikipedia.org/wiki/Long_short-term_memory, May 8, 2020, p. 1-13.

Anonymous, "Mel-Frequency Cepstrum," Wikipedia, https://en.wikipedia.org/wiki/Mel-frequency_cepstrum, May 8, 2020, pp. 1-4.

Anonymous, Watson Media, "Streaming Video Platform & Hosting Services," https://video.ibm.com/, 2018, pp. 1-5.

Cisco, "Cisco Unified Workforce Optimization Quality Management User Guide Release 11.5," Cisco Systems, Inc., Oct. 28, 2019, pp. 1-213.

Daga et al., Domain-Specific Language Model Using Domain Literature and Experts' Spoken Language, ip.com, Oct. 20, 2017, pp. 1-11.

Disclosed Anonymously, "Click-To-Call Conversion Measurement Based On Transcribing Conversation," ip.com, Feb. 13, 2019, pp. 1-6.

Disclosed Anonymously, "Extracting Meaning and Sentiment From Recorded Conversations Using NLP According to a User's Physiological Signal Spikes in Order to Compose Sound Highlights," ip.com, Dec. 18, 2019, pp. 1-5.

Disclosed Anonymously, "System and Method to Record, Transcribe and Index a Custodian's Compliance to a Legal Notice Through a Telephonic Conversation," ip.com, Feb. 8, 2017, pp. 1-6.

Duran, et al., "Align: Analyzing Linguistic Interactions With Generalizable Techniques—A Python Library," American Psychological Association, 2019, pp. 1-68.

Hansen, "Knowledge Sharing, Maintenance and Use in Online Support Communities," ResearchGate, https://www.researchgate.net/publication/30858323, Apr. 2006, pp. 1-399.

Mell et al., "The NIST Definition of Cloud Computing", National Institute of Standards and Technology, Special Publication 800-145, Sep. 2011, pp. 1-7.

Myers, "How Transcriptions Can Help Professors with Lecture Courses," Rev.Com, https://www.rev.com/blog/how-transcriptions-can-help-professors-with-lecture-courses, Aug. 23, 2019, pp. 1-7.

Tatan, "Auto Generated FAQ with Python Dash, Topic Analysis and Reddit Praw API," Towards Data Science, https://towardsdatascience.com/auto-generated-faq-with-python-dash-text-analysis-and-reddit-api-90fb66a86633, May 14, 2019, pp. 1-3.

\* cited by examiner

INTELLIGENT MEDIA TRANSCRIPTION

BACKGROUND

The exemplary embodiments relate generally to digital media, and more particularly to transcribing digital media.

Many meetings, presentations, and lessons are recorded such that they can be referenced at a later time. Many people may prefer to read a transcript or outline of a recording instead of watching or listening to the recording. For example, a professor may record their lecture on video so that their students can later watch the video and review concepts that were taught in the lecture. Many of the professor's students may prefer to review a transcript or outline of the professor's lecture instead of watching the recorded lecture.

SUMMARY

The exemplary embodiments disclose a method, a computer program product, and a computer system for transcribing media. The exemplary embodiments may include collecting media, extracting one or more features from the media, and transcribing the media based on the extracted one or more features and one or more models.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
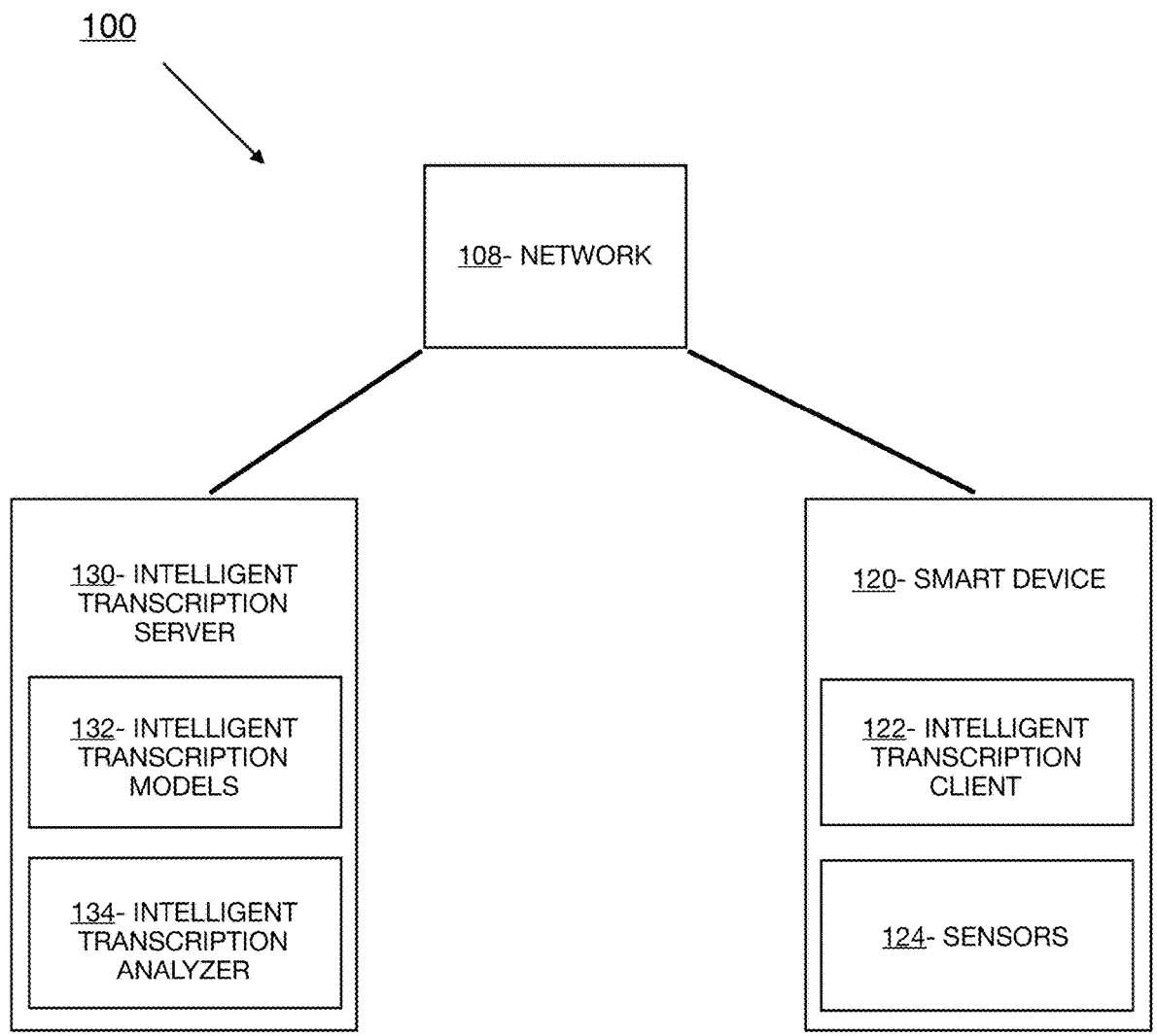
FIG. 1 depicts an exemplary schematic diagram of an intelligent transcription system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many meetings, presentations, and lessons are recorded such that they can be referenced at a later time. Many people may prefer to read a transcript or outline of a recording instead of watching or listening to the recording. For example, a professor may record their lecture on video so that their students can later watch the video and review concepts that were taught in the lecture. Many of the professor's students may prefer to review a transcript or outline of the professor's lecture instead of watching the recorded lecture.

Exemplary embodiments are directed to a method, computer program product, and computer system for transcribing media. In embodiments, machine learning may be used to create models capable of transcribing media, while feedback loops may improve upon such models. Moreover, data from user uploads, databases, or the sensors 124 may be used to transcribe media. A user may wish for media to be transcribed into a number of different formats for a number of purposes or circumstances. For example, a professor may record their lecture on video so that their students can later watch the video and review concepts that were taught in the lecture. Many of the professor's students may prefer to review a transcript or outline of the professor's lecture instead of watching the recorded lecture. In another example, a creator of an instructional video may prefer for their video to include a written tutorial with examples that viewers can see while watching their video. In general, it will be appreciated that embodiments described herein may relate to aiding in any kind of transcription of media (i.e., video recording, audio recording, etc.) within any environment and for any motivation.

FIG. 1 depicts the intelligent transcription system 100, in accordance with the exemplary embodiments. According to the exemplary embodiments, the intelligent transcription system 100 may include a smart device 120 and an intelligent transcription server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the intelligent transcription system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes an intelligent transcription client 122 and one or more sensors 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The intelligent transcription client 122 may act as a client in a client-server relationship with a server, for example an intelligent transcription server 130. The intelligent transcription client 122 may also be a software and/or hardware application capable of communicating with and providing a user interface for a user to interact with a server via the network 108. Moreover, in the example embodiment, the intelligent transcription client 122 may be capable of transferring data from the sensors 124 between the smart device 120 and other devices via the network 108. In embodiments, the intelligent transcription client 122 utilizes various wired and wireless connection protocols for data transmission and exchange, including Bluetooth, 2.4 gHz and 5 gHz internet, near-field communication, Z-Wave, Zigbee, etc. The intelligent transcription client 122 is described in greater detail with respect to FIG. 2.

In example embodiments, the sensors 124 may comprise a camera, microphone, light sensor, infrared sensor, movement detection sensor, pressure detection sensor, thermometer, speedometer, accelerometer, gyroscope, heart rate monitor, smell sensor, or other sensory hardware equipment. Moreover, the smart device 120 may incorporate an array of the one or more sensors 124 such that information can be obtained by the sensors 124 in multiple directions, at different times/intervals, in different mediums/frequencies, and the like. For example, the smart device 120 may include three forward-facing cameras that each record an adjacent sixty-degree viewing angle spanning a total of one-hundred and eighty degrees in the direction of a user. Moreover, data processing techniques may be implemented such that directional information of visual and audio data can be obtained based on signals received by each of the three sensors 124, such as trilateration and triangulation.

While the sensors 124 are depicted as integrated with the smart device 120, in embodiments, the sensors 124 may be incorporated within an environment in which the intelligent transcription system 100 is implemented. For example, the sensors 124 may be one or more microphones built into an auditorium, a camera built into a facility, a spectrometer, infrared thermometer, pedometer, etc. Moreover, data processing techniques may be implemented such that directional information of visual and audio data can be obtained based on signals received by each of the sensors 124, such as trilateration and triangulation. In other embodiments, the sensors 124 may be integrated with other smart devices, e.g., smart phones and laptops, within an environment implementing the intelligent transcription system 100. In such embodiments, the sensors 124 may communicate directly with other networks and devices, such as the network 108. In embodiments, the intelligent transcription analyzer 134 may utilize data collected from the sensors 124 to record video. The sensors 124 are described in greater detail as a hardware implementation with reference to FIG. 5, as part of a cloud implementation with reference to FIG. 6, and/or as utilizing functional abstraction layers for processing with reference to FIG. 7.

In the exemplary embodiments, the intelligent transcription server 130 may include one or more intelligent transcription models 132 and an intelligent transcription analyzer 134, and may act as a server in a client-server relationship with the intelligent transcription client 122. The intelligent transcription server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the intelligent transcription server 130 is shown as a single device, in other embodiments, the intelligent transcription server 130 may be comprised of a cluster or plurality of computing devices, working together or working independently. The intelligent transcription server 130 is described in greater detail as a hardware implementation with reference to FIG. 5, as part of a cloud implementation with reference to FIG. 6, and/or as utilizing functional abstraction layers for processing with reference to FIG. 7.

The intelligent transcription models 132 may be one or more algorithms modelling a correlation between one or more features detected by the sensors 124 and a media transcription style, media transcription, or both. In the example embodiment, the intelligent transcription models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of one or more features being indicative of an appropriate media transcription style, media transcription, or both. In embodiments, such features may include speech features such as topics, importance, vocabulary, frequency, tones, moods, etc. Such features may additionally include gestural features such as pointing, waving, facial expressions, eye direction/movement, etc. The intelligent transcription models 132 may weight the features based on an effect that the features have on appropriately transcribing media.

In the exemplary embodiments, the intelligent transcription analyzer 134 may be a software and/or hardware program capable of collecting training data, extracting features from the training data, and training one or more models based on the extracted features. The intelligent transcription analyzer 134 may additionally be capable of configuring a session and collecting media data, extracting features from the collected media data, and applying one or more models to the extracted features to transcribe the media. Moreover, the intelligent transcription analyzer 134 may be further configured for notifying the user and other people of the media transcription. The intelligent transcription analyzer 134 is additionally capable of evaluating whether the media transcription was appropriate and adjusting the one or more models. The intelligent transcription analyzer 134 is described in greater detail with reference to FIG. 2.

Figure 2:
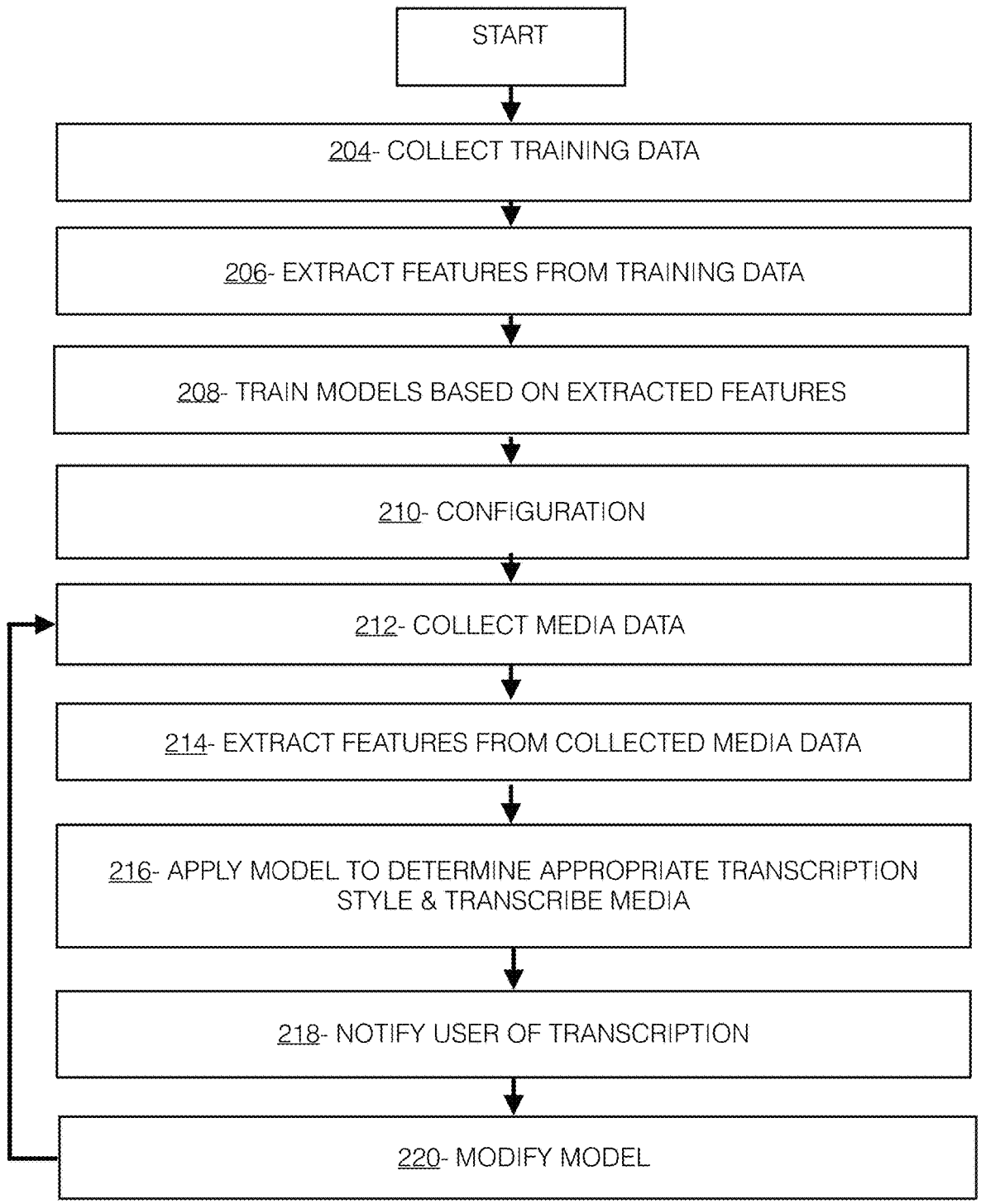
FIG. 2 depicts an exemplary flowchart illustrating the operations of an intelligent transcription analyzer 134 of the intelligent transcription system 100 in transcribing media, in accordance with the exemplary embodiments.

FIG. 2 depicts an exemplary flowchart illustrating the operations of an intelligent transcription analyzer 134 of the intelligent transcription system 100 in transcribing media, in accordance with the exemplary embodiments. In exemplary embodiments, the intelligent transcription analyzer 134 first implements a training phase in which it trains the intelligent transcription models 132 using training data including various media, associated appropriate transcription styles, and transcriptions of the various media. In embodiments, the intelligent transcription analyzer 134 may utilize the trained intelligent transcription models 132 to determine an appropriate type of transcription for media. In other embodiments, the intelligent transcription analyzer 134 may utilize the trained intelligent transcription models 132 to transcribe media. In yet further embodiments, the intelligent transcription analyzer 134 may utilize the trained intelligent transcription models 132 to both determine an appropriate type of transcription for media as well as transcribe the media. The intelligent transcription analyzer 134 then moves on to an operational phase in which it applies the trained intelligent transcription models 132 to current media in order to appropriately transcribe the media.

The intelligent transcription analyzer 134 may collect and/or receive training data (step 204). In embodiments, training data may include media labelled with corresponding appropriate transcription styles, and transcriptions of the media. For example, the intelligent transcription analyzer 134 may collect an audio file of a tutorial labelled with transcription style "tutorial" and a transcription of a step-by-step process detailed by the audio recording. The intelligent transcription analyzer 134 may additionally collect a video of a classroom lecture labelled with transcription style "outline" and an outline transcription of the content of the lecture. The outline transcription may additionally include highlighted, underlined, bolded, etc. text as well as annotations and/or comments for emphasis of subject matter that may be present on an upcoming examination. The intelligent transcription analyzer 134 may retrieve training data via user upload, databases, or the sensors 124. In embodiments, the intelligent transcription analyzer 134 may collect training data via the sensors 124 as one or more microphones built into an auditorium, a camera built into a facility, etc. For example, video camera sensors 124 may collect video footage of a professor giving a classroom lecture and then subsequently uploading the corresponding transcription style "outline" and an annotated outline transcription of the lecture. The intelligent transcription analyzer 134 may treat the video camera data as labelled by the uploaded transcription style and/or transcription and may collect both types of data as training data. In embodiments, collected training data may also be associated to one or more users. For example, a video of John giving a presentation may be labelled with transcription style, "slideshow presentation" and associated transcription consisting of John's annotated slideshow deck, and additionally labelled with, "user: John." The intelligent transcription analyzer 134 may collect training data associated with specific users to later train different intelligent transcription models 132 for different users based on the users' preferences, characteristics, and/or tendencies. In embodiments, collected training data may include global positioning services (GPS) data of one or more users, for example to determine whether one or more users are present during a recording.

To further illustrate the operations of the intelligent transcription analyzer 134, reference is now made to an illustrative example where the intelligent transcription analyzer 134 collects training data consisting of various media labelled with corresponding appropriate transcription styles, users, and transcriptions of the media.

The intelligent transcription analyzer 134 may extract one or more features from the collected and/or received training data (step 206). The extracted features may be extracted from the collected training data, which may include audio, video, etc. media as well as tags, keywords, metadata, hashtags, file extensions/formats, etc. of a media file, and may include features related to a user's speech such as topics, importance, vocabulary, frequency, tones, moods, etc. as well as features related to a user's gestures such as pointing, waving, facial expressions, eye direction/movement, etc. In embodiments, the intelligent transcription analyzer 134 may use techniques such as feature extraction, natural language processing, sentiment analysis, optical character recognition, image processing, audio processing, pattern/template matching, data comparison, etc. to identify speech features such as topics, importance, vocabulary, frequency, tones, moods, etc. of media. For example, the intelligent transcription analyzer 134 may compare images, audio, and video of media with images, audio, and video of one or more databases, social networks, and the internet via network 108 to identify topics, importance, vocabulary, frequency, tones/moods, etc. of media. The intelligent transcription analyzer 134 may utilize optical character recognition to extract topics and vocabulary from media. For example, the intelligent transcription analyzer 134 may determine that an image or video of a presentation slide has topic, "Multivariable Calculus" and may use image processing to further extract vocabulary "multivariable integrals." The intelligent transcription analyzer 134 may additionally utilize image processing, audio processing, video processing, and natural language processing to extract an importance. For example, the intelligent transcription analyzer 134 may utilize image processing and video processing to extract highlighted, bolded, underlined, etc. text of a presentation slide signalling relative importance, and may utilize audio processing and natural language processing to extract a user saying words, phrases, sentences, etc. indicative of importance such as, "This will be on the examination," "Make sure you understand this concept," "This is a crucial step," etc. The intelligent transcription analyzer 134 may additionally utilize audio and video processing to extract tones or moods of a user's speech. For example, if a user is discussing a first topic in a calm and relaxed manner, the intelligent transcription analyzer 134 may extract mood "calm" for the first topic and if the user is discussing a second topic with stress and emphasis, the intelligent transcription analyzer 134 may extract tone "stress" and additionally extract a high level of importance for the second topic. In embodiments, the intelligent transcription analyzer 134 may extract speech features such as topics, importance, vocabulary, frequency, tones, moods, etc. directly from tags, keywords, metadata, hashtags, etc. of collected media files.

In addition to extracting speech features such as topics, importance, vocabulary, frequency, tones, moods, etc., the intelligent transcription analyzer 134 may also extract gestural features such as pointing, waving, facial expressions, eye direction/movement, etc. (step 206 continued). In embodiments, the intelligent transcription analyzer 134 may use techniques such as feature extraction, sentiment analysis, image processing, pattern/template matching, data comparison, convolutional neural networks, etc. to identify gestures such as pointing, waving, facial expressions, eye direction/movement, etc. For example, if video is collected of a user pointing and looking at a single rock out of a row of five rocks during a geology lecture, the intelligent transcription analyzer 134 may extract the user's pointing and looking at the single rock as indicative of that rock's importance. If video of a user's face shows sharp and angry facial expressions, the intelligent transcription analyzer 134 may extract the user's facial expressions as indicative of frustration, and may correlate the user's frustration with angry speech tones and a high importance of the user's spoken subject matter. The intelligent transcription analyzer 134 may later associate extracted gestures with the topics of media and importance of those topics, vocabulary, etc. when training one or more models.

With reference to the previously introduced example where the intelligent transcription analyzer 134 collects training data consisting of various media labelled with corresponding appropriate transcription styles and transcriptions of the media, the intelligent transcription analyzer 134 extracts speech features such as topics, importance, vocabulary, frequency, tones, moods, etc. as well as gestural features such as pointing, waving, facial expressions, eye direction/movement, etc. from the collected training data with respect to each labelled media.

The intelligent transcription analyzer 134 may train one or more intelligent transcription models 132 based on the extracted features (step 208). The intelligent transcription analyzer 134 may train one or more intelligent transcription models 132 based on an association of the one or more extracted features with labelled transcription styles and transcriptions. As previously mentioned, such extracted features may include speech features such as topics, importance, vocabulary, frequency, tones, moods, etc. as well as gestural features such as pointing, waving, facial expressions, eye direction/movement, etc. and the one or more intelligent transcription models 132 may be generated through machine learning techniques such as convolutional neural networks and/or bi-long short-term memory. Moreover, the intelligent transcription analyzer 134 may train the one or more intelligent transcription models 132 to weight the features such that features shown to have a greater correlation with an appropriate transcription style and/or transcription are weighted greater than those features that are not. As previously mentioned, the trained intelligent transcription models 132 identify an appropriate transcription style of a media, transcribe the media, or both. Moreover, the intelligent transcription analyzer 134 may train different intelligent transcription models 132 for different users based on user preferences. With reference to the former, the intelligent transcription analyzer 134 may utilize the trained intelligent transcription models 132 to determine an appropriate transcription style of a media, for example determining that an outline, summary, presentation with annotated slides or notes, blog with comments, tutorial with examples, etc. is appropriate. With reference to the latter, the intelligent transcription analyzer 134 may utilize the trained intelligent transcription models 132 to transcribe media, for example by utilizing various audio, image, video, etc. processing techniques (i.e. mel-frequency cepstral coefficients). Based on the intelligent transcription models 132's extracted features and weights associated with such extracted features, the intelligent transcription analyzer 134 may later determine an appropriate transcription style and transcription of current media.

With reference to the previously introduced example where the intelligent transcription analyzer 134 extracts speech features such as topics, importance, vocabulary, frequency, tones, moods, etc. as well as gestural features such as pointing, waving, facial expressions, eye direction/movement, etc. from the collected training data with respect to each labelled media, the intelligent transcription analyzer 134 trains a model for each labelled user of the collected training data based on an association of the extracted features with the types of transcriptions and transcriptions of the media.

The intelligent transcription analyzer 134 may receive a configuration (step 210). The intelligent transcription analyzer 134 may receive a configuration by receiving a user registration and user preferences. The user registration may be uploaded by a user, i.e., a person speaking or featured in a video, a person recording a video, a person who will read a transcription, etc., and the configuration may be received by the intelligent transcription analyzer 134 via the intelligent transcription client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial number, smart device 120 type, types of the sensors 124, and the like. Lastly, the intelligent transcription analyzer 134 may receive a configuration of the one or more sensors 124, whether they be fixed to one or more devices (e.g., the smart device 120) or fixed within an environment in which the intelligent transcription system 100 is implemented.

During configuration, the intelligent transcription analyzer 134 may further receive user preferences (step 210 continued). User preferences may include preferences for the manner in which the intelligent transcription analyzer 134 should notify one or more users of transcribed media. User preferences may additionally include preferences for the manner in which the intelligent transcription analyzer 134 should notify others of transcribed media (e.g. students of a class, viewers of a video stream, subscribers to a blog or channel, etc.). For example, a professor may upload user preferences specifying that they are to be notified of transcribed media before any students are to be notified of transcribed media. In embodiments, user preferences may specify that a user confirm or approve transcribed media prior to notifying any other users or anyone else. For example, a journalist may upload user preferences specifying that they must approve a media transcription before subscribers to the journalist's blog are notified of the media transcription.

With reference to the previously introduced example where the intelligent transcription analyzer 134 trains a model for each labelled user of the collected training data based on an association of the extracted features with the types of transcriptions and transcriptions of the media, the user uploads a user registration including the user's name, user's computer as smart device 120, and user's video cameras as sensors 124. The user also uploads user preferences specifying that notification of media transcriptions is to be communicated to the user and requires user confirmation prior to being communicated to the user's students.

The intelligent transcription analyzer 134 may collect media data (step 212). The media data may include the media to be transcribed (i.e. media recorded by the user, media the user intends to be distributed, media the user intends to consume) as well as any tags, keywords, metadata, hashtags, file extensions/formats, etc. of the media, and the intelligent transcription analyzer 134 may retrieve media data via user upload, databases, integration of the intelligent transcription client 122 with the operating system of smart device 120, or the one or more sensors 124. In embodiments, the intelligent transcription analyzer 134 may collect media data via the sensors 124 as one or more microphones built into an auditorium, a camera built into a facility, etc. For example, video camera sensors 124 and microphone sensors 124 may collect footage of a user giving a presentation. The intelligent transcription analyzer 134 may collect both the video camera and microphone data as media to be transcribed. The intelligent transcription analyzer 134 may collect media data to later extract features of the media data and apply one or more intelligent transcription models 132 to appropriately transcribe the media.

Figure 3:
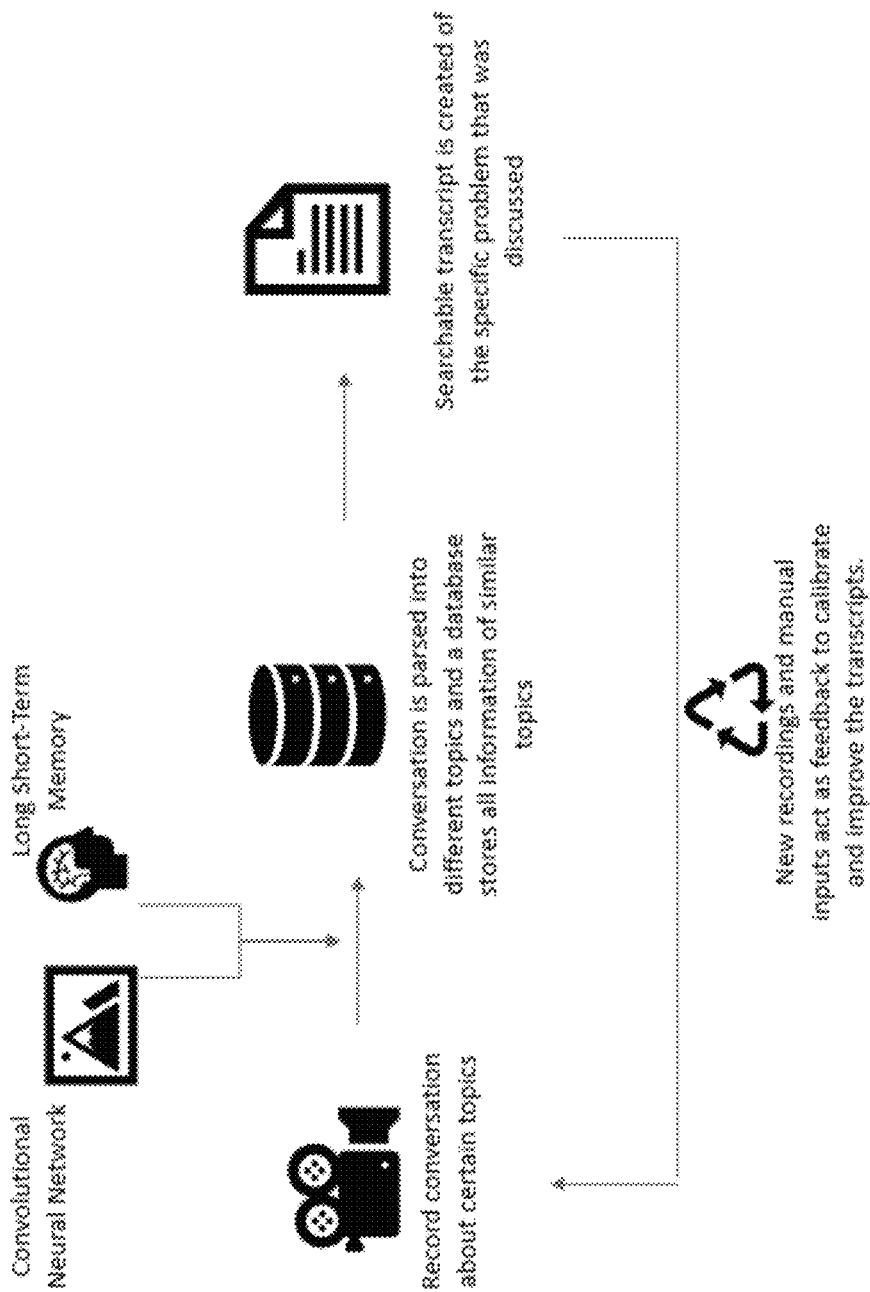
FIG. 3 depicts an exemplary flowchart illustrating the operations of an intelligent transcription analyzer 134 of the intelligent transcription system 100 in transcribing media, in accordance with the exemplary embodiments.

With reference to the previously introduced example where the user uploads a user registration and user preferences, and additionally with reference to FIG. 3, the intelligent transcription analyzer 134 collects media data of the user giving a presentation from the user's video camera sensors 124.

The intelligent transcription analyzer 134 may extract one or more features from the collected media data (step 214). The intelligent transcription analyzer 134 may extract one or more features from the collected media data in the same manner as described above with respect to extracting features from the training data. However, the intelligent transcription analyzer 134 extracts one or more features from the current collected media data instead of from the previously collected training data.

With reference to the previously introduced example where the intelligent transcription analyzer 134 collects media data of the user giving a presentation from the user's video camera sensors 124, and additionally with reference to FIG. 3, the intelligent transcription analyzer 134 utilizes a convolutional neural network and long short-term memory to parse the user's presentation and additionally extracts the features listed in Table 1 below.

TABLE 1

| Extracted Features | |
|---|---|
| Topic: Addition | Importance: High (on exam) |
| | Tone/Mood: Stressed |
| | Facial Expression: Serious |
| | Pointing |
| Topic: Subtraction | Importance: High (on exam) |
| | Tone/Mood: Stressed |
| | Facial Expression: Serious |
| | Pointing, Waving |
| Topic: Multiplication | Importance: Low (not on exam) |
| | Tone/Mood: Relaxed |
| | Facial Expression: Smiling |
| Topic: Division | Importance: Low (not on exam) |
| | Tone/Mood: Relaxed |
| | Facial Expression: Smiling |

The intelligent transcription analyzer 134 may apply one or more models to the extracted features to determine an appropriate transcription style and/or transcribe media (step 216). As previously mentioned, such extracted features may include speech features such as topics, importance, vocabulary, frequency, tones, moods, etc. as well as gestural features such as pointing, waving, facial expressions, eye direction/movement, etc., and the one or more intelligent transcription models 132 may be generated through machine learning techniques such as neural networks. In embodiments, the one or more intelligent transcription models 132 may be trained at initialization and/or through the use of a feedback loop to weight the features such that features shown to have a greater correlation with determining appropriate transcription styles and/or transcribing media are weighted greater than those features that are not. Based on the extracted features and weights associated with such extracted features, the intelligent transcription analyzer 134 may determine an appropriate transcription style (i.e. outline, summary, presentation with annotated slides or notes, blog with comments, tutorial with examples, etc.) and transcribe the media. In embodiments, media transcriptions may include one or more of bolded text, highlighted text, underlined text, timestamps, etc. and may be searchable by one or more users and/or any other people. In embodiments, timestamps may refer to a time of the media where the user presents, discusses, explains, etc. corresponding content of the media.

With reference to the previously introduced example where the intelligent transcription analyzer 134 extracts features of the recorded video, and additionally with reference to FIG. 3, the intelligent transcription analyzer 134 determines that an outline is an appropriate transcription style and transcribes the video in the format of a searchable outline with timestamps and sections of text considered "high importance" bolded and highlighted.

Upon the intelligent transcription analyzer 134 determining the appropriate transcription style and transcribing the media, the intelligent transcription analyzer 134 may notify the user of the transcription (step 218). The intelligent transcription analyzer 134 may convey the transcription to the user in the form of audio, video, text, or any other manner via the smart device 120 or any other device. The transcription may be conveyed visually via text and/or audially via one or more integrated speakers. In embodiments, the intelligent transcription analyzer 134 may notify one or more users by printing a transcription. As previously discussed, the intelligent transcription analyzer 134 may notify the user of the transcription according to the user preferences of configuration.

Figure 4:
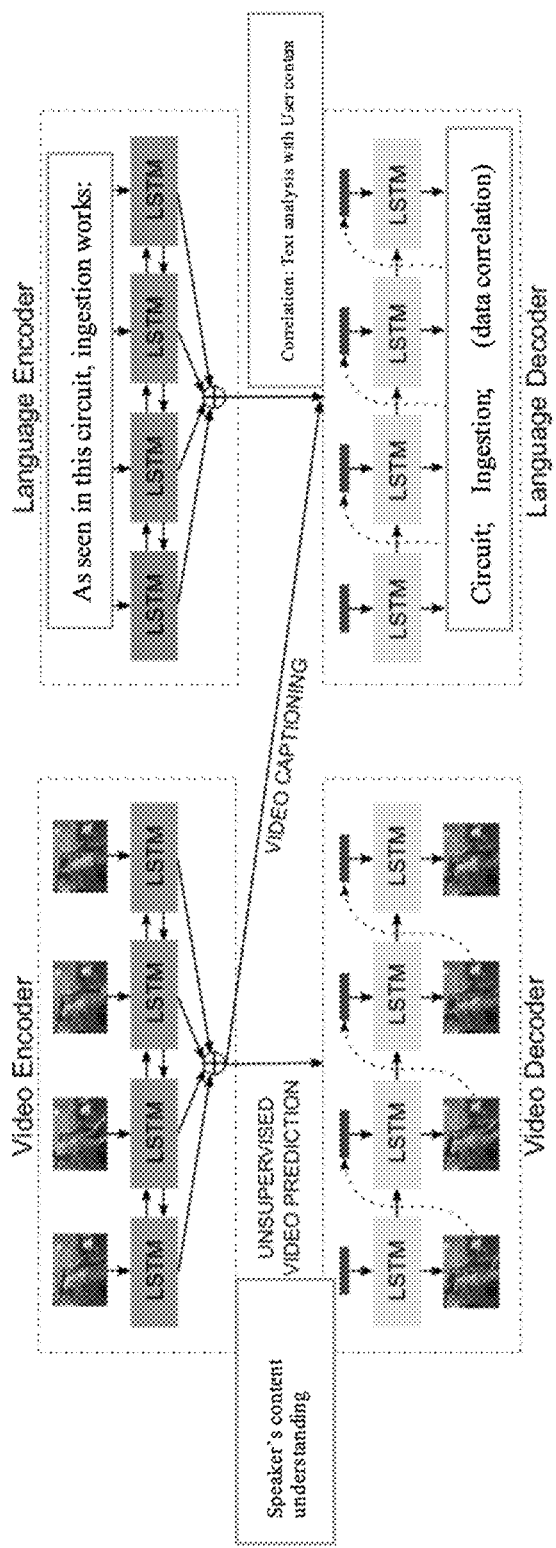
FIG. 4 depicts an exemplary block diagram depicting the operations of an intelligent transcription analyzer 134 of the intelligent transcription system 100 in synchronizing the presentation of a video with the video's transcription.

In embodiments, the intelligent transcription analyzer 134 may determine that certain transcriptions are to be read, listened to, etc. by one or more users alongside snippets of or the entirety of the original media that was transcribed (step 218 continued). In these embodiments, the intelligent transcription analyzer 134 may notify the user of both the media and the transcription at once. For example, if the intelligent transcription analyzer 134 determines that a tutorial transcription should be read alongside a video demonstrating steps of the tutorial, the intelligent transcription analyzer 134 may notify the user of both the tutorial transcription and the demonstration video simultaneously. In these embodiments, and with reference to FIG. 4, a video encoder, video decoder, language encoder, and language decoder may be utilized to synchronize the presentation of the media and the transcription to one or more users and/or other people. As shown in FIG. 4, to synchronize the transcription with corresponding sections of the media, the intelligent transcription analyzer 134 defines the context of the media by using a hybrid of tools, such as, but not limited to, Convolutional Neural Networks (CNN), Recurrent Neural Networks (RNN), and Long Short Term Memory (LSTM). These tools first pass the current video into an encoder and then turn it into a decoder. The encoder breaks the media into multiple parts and defines the context of each part. The decoder predicts what context should follow certain parts of the video. Together, this process allows for the grouping of similar contextual content based on the sequence of the media. In parallel, a similar approach is taken for the textual analysis. The language encoder analyzes the context of text, both from the media and from training data of the speaker, to predict and classify text of similar context. From there, correlations can be made between the contextualized media & contextualized textual content at specific times in the sequence, providing a bridge between similar content across both the media and text. In embodiments, the intelligent transcription analyzer 134 may be configured for receiving user input acknowledging, dismissing, and/or affirming that one or more of the media transcription style, media transcription, and synchronization of media transcription with original media is appropriate.

With reference to the previously introduced example where the intelligent transcription analyzer 134 determines that an outline is an appropriate transcription style and transcribes the video in the format of a searchable outline with timestamps and sections of text considered "high importance" bolded and highlighted, the intelligent transcription analyzer 134 visually notifies the user of the outline transcription according to the user's preferences.

The intelligent transcription analyzer 134 may evaluate and modify the intelligent transcription models 132 (step 220). In the example embodiment, the intelligent transcription analyzer 134 may verify whether the media was properly transcribed in order to provide a feedback loop for modifying the intelligent transcription models 132. In embodiments, the feedback loop may simply provide a means for a user to indicate whether the media transcription was appropriate, accurate, helpful, etc. The feedback loop indication may be triggered via a toggle switch, button, slider, etc. that may be selected by the user manually by hand using a button/touchscreen/etc., by voice, by eye movement, and the like. Based on the intelligent transcription analyzer 134 appropriately or inappropriately determining a transcription style, the intelligent transcription analyzer 134 may modify the intelligent transcription models 132 relating to determination of a media transcription style. Based on the intelligent transcription analyzer 134 appropriately or inappropriately transcribing media, the intelligent transcription analyzer 134 may modify the intelligent transcription models 132 with respect to transcribing media. In other embodiments, the intelligent transcription analyzer 134 may infer or deduce whether the media transcription was appropriate. For example, the intelligent transcription analyzer 134 may interpret user dialogue via natural language processing to determine whether the transcription was reasonable. For example, if the user says, "That isn't right" or other expressions indicative of confusion or dissatisfaction, the intelligent transcription analyzer 134 may infer that the transcription was inappropriate and modify the intelligent transcription models 132 accordingly. In another example, if a user proceeds to edit a transcription, the intelligent transcription analyzer 134 may infer that the user was not satisfied with the transcription and modify the intelligent transcription models 132 accordingly. Based on feedback received in the above or any other manners, the intelligent transcription analyzer 134 may then modify the intelligent transcription models 132 to more accurately transcribe media.

In some embodiments, a user may wish for other people to be notified of a transcription upon the user's approval of the transcription (step 220 continued). For example, if the intelligent transcription analyzer 134 notifies a professor of a transcription of a mathematics lecture and the professor confirms that the transcription is appropriate, the intelligent transcription analyzer 134 may subsequently notify all of the students enrolled in the professor's mathematics course of the transcription.

With reference to the previously introduced example where the intelligent transcription analyzer 134 notifies the user of the outline transcription according to the user's preferences, and additionally with reference to FIG. 3, the user says, "That is helpful" and the intelligent transcription analyzer 134 modifies the intelligent transcription models 132 accordingly. The intelligent transcription analyzer 134 additionally notifies the user's students of the outline transcription.

FIG. 3 depicts an exemplary flowchart illustrating the operations of an intelligent transcription analyzer 134 of the intelligent transcription system 100 in transcribing media, in accordance with the exemplary embodiments.

FIG. 4 depicts an exemplary block diagram depicting the operations of an intelligent transcription analyzer 134 of the intelligent transcription system 100 in synchronizing the presentation of a video with the video's transcription.

Figure 5:
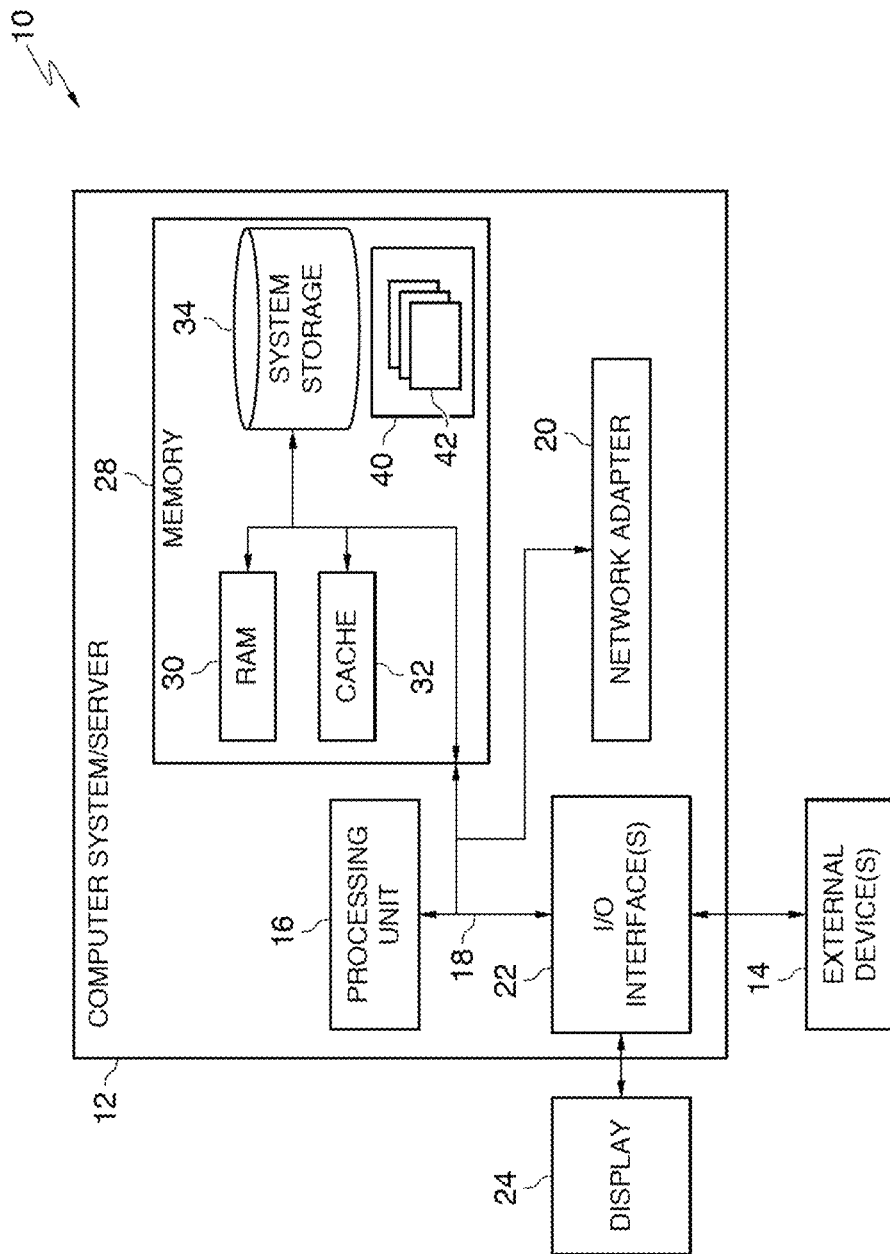
FIG. 5 depicts an exemplary block diagram depicting the hardware components of the intelligent transcription system 100 of FIG. 1, in accordance with the exemplary embodiments.

FIG. 5 depicts a block diagram of devices within the intelligent transcription system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
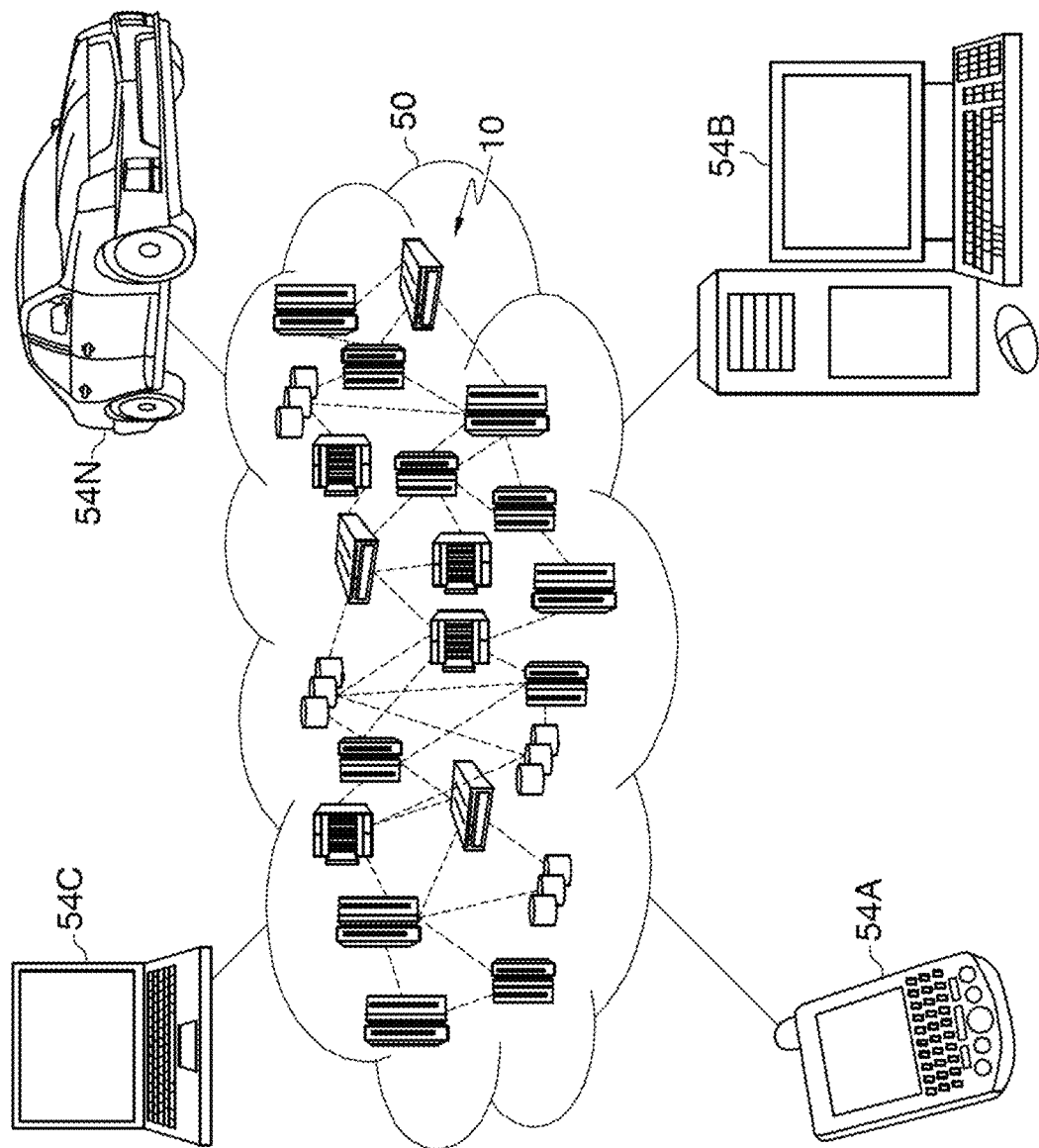
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
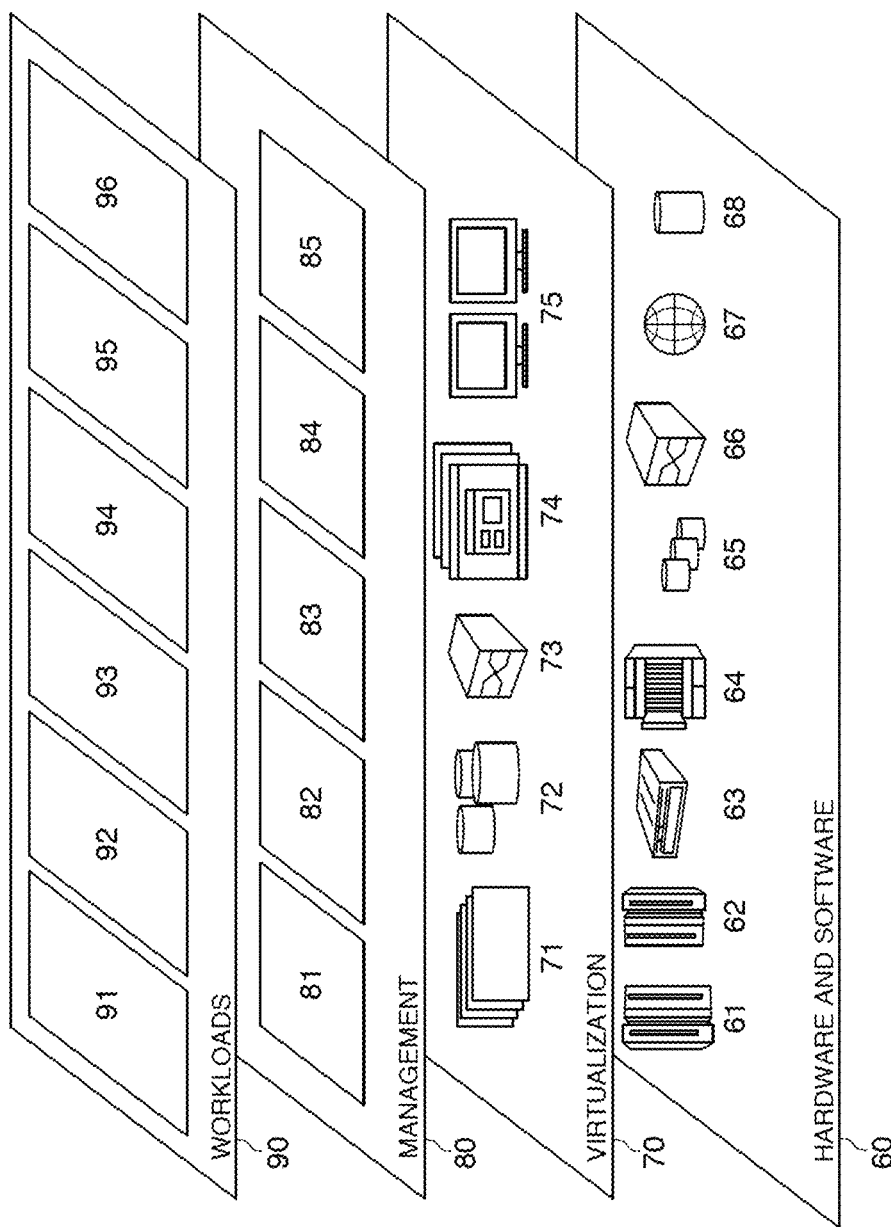
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media transcription 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for transcribing media, the method comprising:
   collecting media of a user, wherein the media comprises content of a presentation given by the user;
   extracting one or more features from the media, wherein the extracting is performed using machine learning techniques comprising a convolutional neural network and long short-term memory to parse the collected media and extract the one or more features, and wherein the one or more extracted features comprise one or more speech features;
   determining, using one or more models, a transcription style based on the one or more extracted speech features, wherein the one or more models are trained through use of a feedback loop to weight the one or more extracted speech features such that features having a greater correlation with determined particular transcription styles are weighted greater than other features, and wherein the transcription style specifies a transcription format;
   transcribing, using the one or more models, the media, according to the determined transcription style, based on the one or more features, and their associated weights, wherein one or more text portions of the transcription are highlighted and bolded based on respective importance values extracted from the one or more features, and wherein an importance value of a text portion of the transcription indicates whether or not a topic of the text portion will be on an exam;
   notifying the user of the highlighted and bolded transcription in the determined particular style via a device of the user, wherein the notifying is performed according to preferences of the user; and
   receiving, from the user, confirmation of an accuracy of the transcription and approval of the transcription prior to notifying one or more other users of the transcription.

2. The method of claim 1, wherein the one or more models correlate the one or more features with an appropriate transcription style and appropriately transcribing the media.

3. The method of claim 1, further comprising
   receiving feedback indicative of whether the transcription was accurate; and adjusting the one or more models based on the received feedback.

4. The method of claim 1, further comprising:
collecting training data;
extracting training features from the training data; and
training the one or more models based on the extracted training features.

5. The method of claim 1, wherein the transcription style is selected from a group comprising a transcription, outline, summary, presentation with notes, blog with comments, and tutorial with examples.

6. The method of claim 1, wherein:
the user is notified of the transcription along with audio or video of the media; and
the transcription notification is synchronized with the audio or video of the media, wherein the synchronization is based on the media's content.

7. The method of claim 1, wherein the transcription includes one or more timestamps.

8. The method of claim 1, wherein the transcription is searchable by the user.

9. The method of claim 1, wherein the one or more features include topics, importance, frequency, vocabulary, tones, moods, pointing, waving, facial expressions, eye direction, and eye movement.

10. A computer program product for transcribing media, the computer program product comprising:
one or more non-transitory computer-readable storage media and program instructions stored on the one or more non-transitory computer-readable storage media capable of performing a method, the method comprising:
collecting media of a user, wherein the media comprises content of a presentation given by the user;
extracting one or more features from the media, wherein the extracting is performed using machine learning techniques comprising a convolutional neural network and long short-term memory to parse the collected media and extract the one or more features, and wherein the one or more extracted features comprise one or more speech features;
determining, using one or more models, a transcription style based on the one or more extracted speech features, wherein the one or more models are trained through use of a feedback loop to weight the one or more extracted speech features such that features having a greater correlation with determined particular transcription styles are weighted greater than other features, and wherein the transcription style specifies a transcription format;
transcribing, using the one or more models, the media, according to the determined transcription style, based on the one or more features and their associated weights, wherein one or more text portions of the transcription are highlighted and bolded based on respective importance values extracted from the one or more features, and wherein an importance value of a text portion of the transcription indicates whether or not a topic of the text portion will be on an exam;
notifying the user of the highlighted and bolded transcription in the determined particular style via a device of the user, wherein the notifying is performed according to preferences of the user; and
receiving, from the user, confirmation of an accuracy of the transcription and approval of the transcription prior to notifying one or more other users of the transcription.

11. The computer program product of claim 10, wherein the one or more models correlate the one or more features with an appropriate transcription style and appropriately transcribing the media.

12. A computer system for transcribing media, the computer system comprising:
one or more computer processors, one or more computer-readable storage media, and program instructions stored on the one or more of the computer-readable storage media for execution by at least one of the one or more processors capable of performing a method, the method comprising:
collecting media of a user, wherein the media comprises content of a presentation given by the user;
extracting one or more features from the media, wherein the extracting is performed using machine learning techniques comprising a convolutional neural network and long short-term memory to parse the collected media and extract the one or more features, and wherein the one or more extracted features comprise one or more speech features;
determining, using one or more models, a transcription style based on the one or more extracted speech features, wherein the one or more models are trained through use of a feedback loop to weight the one or more extracted speech features such that features having a greater correlation with determined particular transcription styles are weighted greater than other features, and wherein the transcription style specifies a transcription format;
transcribing, using the one or more models, the media, according to the determined transcription style, based on the one or more features and their associated weights, wherein one or more text portions of the transcription are highlighted and bolded based on respective importance-values extracted from the one or more features, and wherein an importance value of a text portion of the transcription indicates whether or not a topic of the text portion will be on an exam;
notifying the user of the highlighted and bolded transcription in the determined particular style via a device of the user, wherein the notifying is performed according to preferences of the user; and
receiving, from the user, confirmation of an accuracy of the transcription and approval of the transcription prior to notifying one or more other users of the transcription.

13. The computer system of claim 12, wherein the one or more models correlate the one or more features with an appropriate transcription style and appropriately transcribing the media.

* * * * *